3,419,795
NMR FLOWMETER EMPLOYING PULSED MAGNETIZATION
William K. Genthe and William H. Vander Heyden, Menomonee Falls, and Donald H. Strobel, Cedarburg, Wis., assignors to Badger Meter Manufacturing Company, Milwaukee, Wis., a corporation of Wisconsin
Continuation-in-part of application Ser. No. 485,842, Sept. 8, 1965. This application Aug. 3, 1966, Ser. No. 570,066
17 Claims. (Cl. 324—.5)

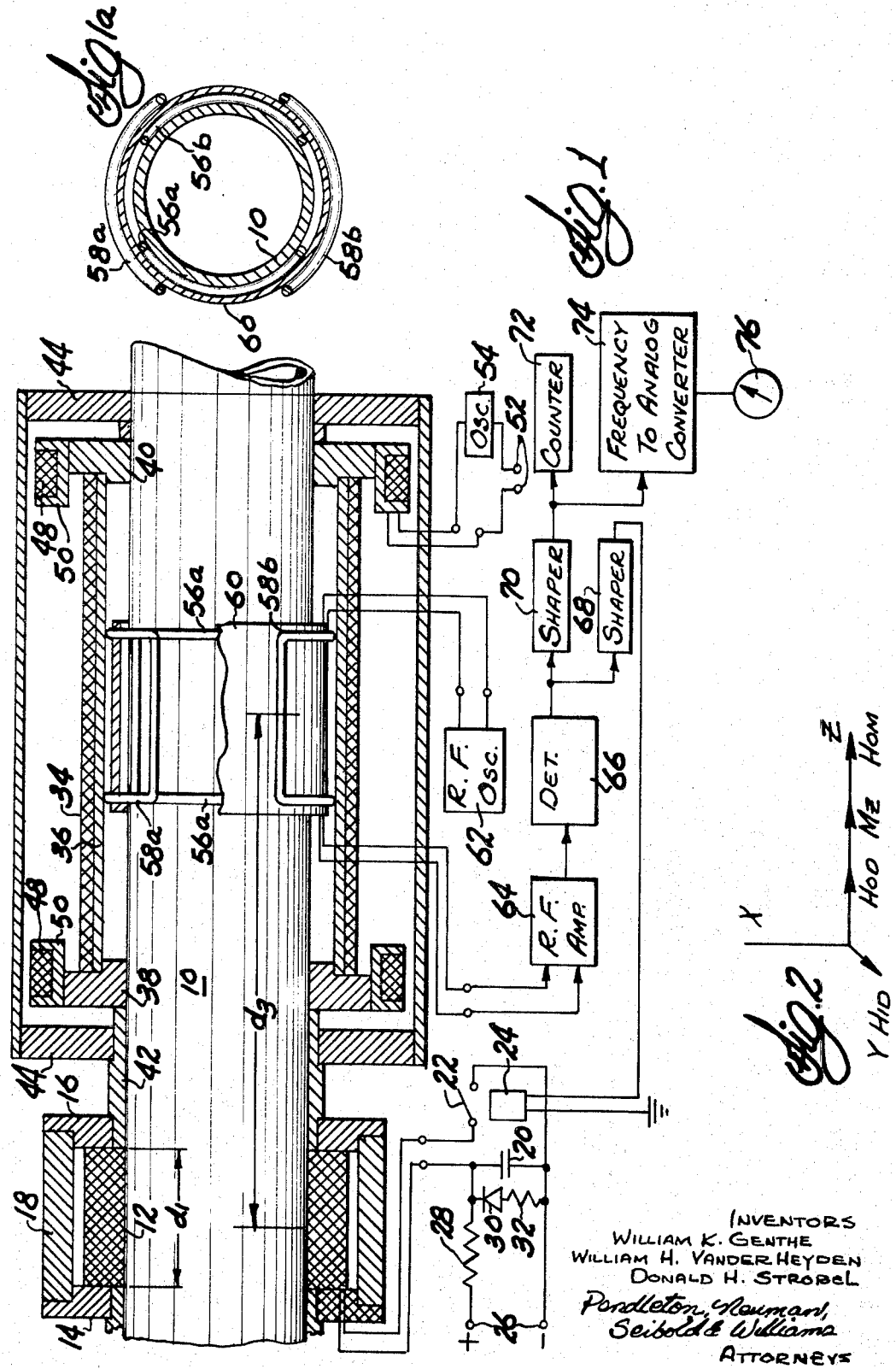

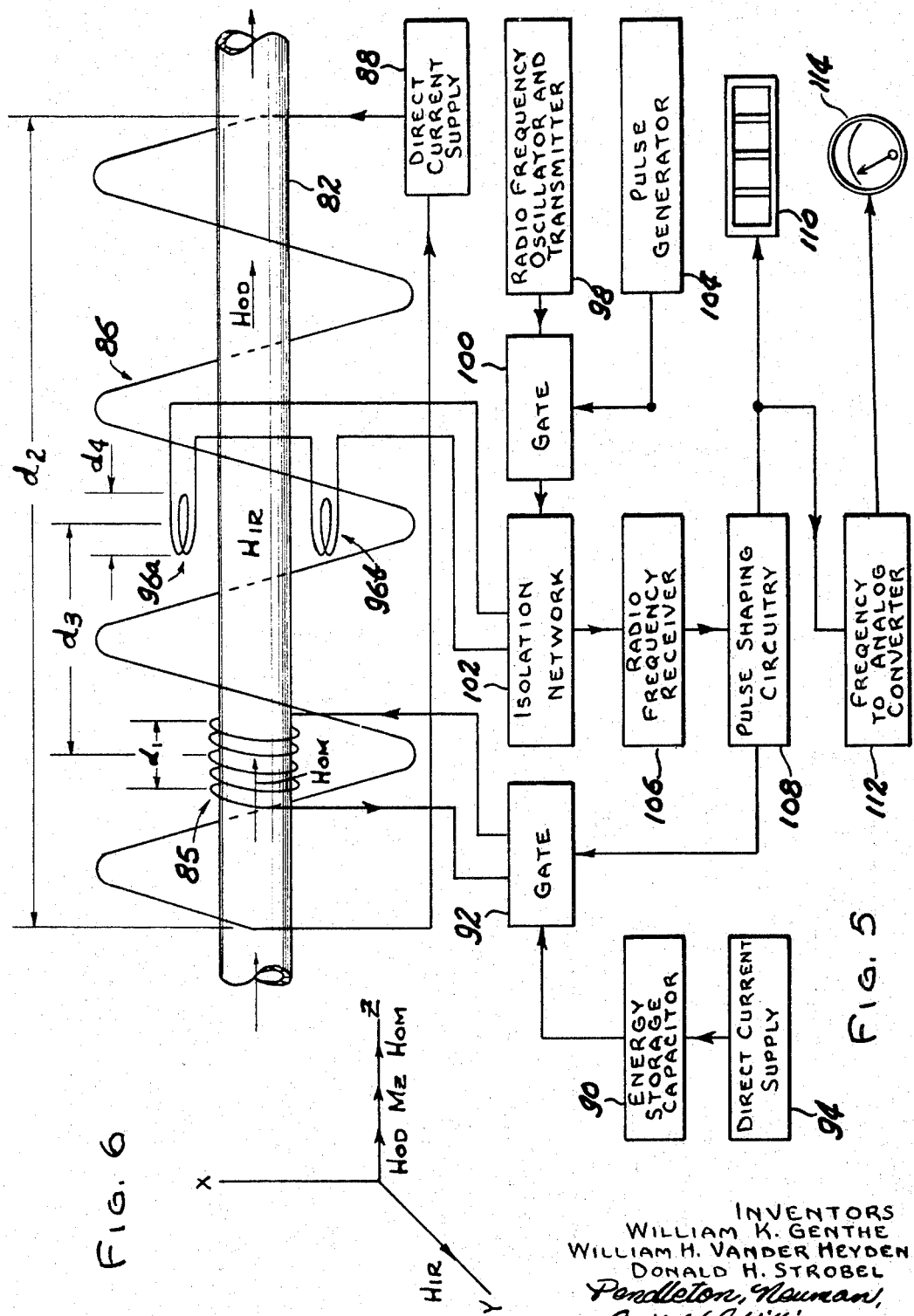

ABSTRACT OF THE DISCLOSURE

This disclosure relates to a flowmeter employing nuclear magnetic resonance for detecting and metering the flow of fluid having a component with a nuclear magnetic moment. The fluid first passes a tagging station at which a preferred alingment is given to the magnetic moment vectors of the nuclei within spaced boluses of the fluid by an intermittently operable high intensity unidirectional field. An R.F. coil, with its axis perpendicular to the direction of the intermittent field, is located shortly downstream from the tagging station. The R.F. coil is excited to induce nuclear magnetic resonance in the fluid, and the detection of the resonance identifies the passage of the tagged boluses.

---

This is a continuation-in-part of an application Ser. No. 485,842 filed by the same inventors on Sept. 8, 1965.

This invention relates to devices used in making measurements of a flowing medium and, more particularly, to a volumetric flow measuring device.

Volumetric flow measurement is presently accomplished by a variety of mechanisms using such elements as venturi tubes, orifice plates, electromagnetic elements, thermal elements, acoustic elements, turbines, nutating discs, and other inferential and positive displacement elements. These methods require either electrical or mechanical contact between the measuring element and the fluid stream. Such contact introduces unavoidable deleterious effects on accuracy or on flow element structure due to deposits, clogging, abrasion, and fouling, particularly when corrosive, abrasive, viscous, or biphase fluids are measured. Flow measurements using pressure differential elements, electromagnetic elements, thermal elements, and acoustic elements are inferred from voltage levels generated by the flow element which are analogs of the flow velocity. Experience has shown that totalization of flow quantities and measurement of average flow velocity is most simply and accurately accomplished using digital, rather than analog, representation. Digital representation, as used herein, refers to the generation of a discrete signal for each elemental quantity of fluid flowing through the flow path, so that the number of such signals may be totaled to reveal the total flow. One system using such a digital representation is a positive displacement type of device, in which a shaft (connected to a mechanical counter) is rotated a discrete amount for each displacement cycle, and the total flow is represented by the total angle through which the shaft moves.

There have been several attempts to make volumetric flow measurements by the use of nuclear magnetic resonance (NMR) phenomena, in which no electrical or mechanical contact with the fluid is required, but these attempts have not been altogether successful, for a number of reasons. In one kind of NMR system, a magnetizable fluid is magnetized by causing it to flow through a relatively long path located within an intense magnetic field. A detection mechanism, located downstream from the magnetic field, detects the amount of magnetization of the fluid after its travel to the detection mechanism. This kind of system is known as a CW (continuous wave) system, in that a continuous signal is produced at the output of the detector, the amplitude of which is proportional to the flow rate of the fluid. Like other analog systems, this system requires frequent calibration in order accurately to determine the volume of fluid flow. Recalibration is also required for each different type of fluid to be measured, for the output amplitude for a given rate of flow is dependent upon a physical constant (having to do with the time rate of decay of the magnetization), which is different for different fluids. In addition, recalibration is also required to compensate for changes in temperature and viscosity in the fluid being metered.

In another NMR system, all of the flowing fluid is magnetized by a long-time flow through an intense magnetic field, just as in the CW system, and then part of the magnetized fluid is demagnetized by application of a pulse of radio frequency (RF) energy at a predetermined frequency. The arrival of the demagnetized fluid at the detection station downstream signifies that the fluid has traveled the distance between the RF demagnetizing station and the detection station. Knowing the cross-sectional area of the fluid flow path, and the distance between the RF demagnetizing station and the detection station, the quantity of fluid flowing through the flow path between the instants of demagnetization and detection can readily be determined.

Both of the NMR systems described above require relatively large and cumbersome equipment, including large magnetizing coils and D.C. power supplies, and long flow paths within the magnetic field. Accordingly, the design of flow measuring apparatus using such previously known systems necessitates large, heavy and expensive equipment. In addition, these systems do not attain sufficient accuracy to enable the use of NMR flow metering in many applications where extreme accuracy is required.

Accordingly, it is a general object of this invention to provide a simply constructed relatively small and light and yet effective and highly accurate NMR flow measuring device.

A further object of this invention is to provide such a flow measuring device which has relatively low power requirements.

Another object of this invention is to provide a flow measuring device which is free from any obstruction in the flow line and in which no electrical or mechanical contact of the measuring elements with the fluid stream is required and which, therefore, is equally well suited for use with homogeneous or non-homogeneous medium, is of sanitary construction and is not subject to deposits, clogging or fouling.

A further object of this invention is to provide a flow measuring device which provides a digital representation of the quantity of fluid passing through the device in unit time.

A still further object of this invention is to provide a flow measuring device which: is more effective over a wider range of flow rates than is possible with conventional flowmeters; maintains high accuracy without recalibration; requires a minimum of maintenance; operates over a wide range of ambient temperatures; and will handle all fluids at least one of whose constituent atomic nuclei displays a magnetic moment.

Another object of the present invention is to provide means for generating extremely homogeneous magnetic fields at the detection station, whereby a high signal-tonoise ratio may be obtained, with the result of increased accuracy.

For the accomplishment of these objects, this invention makes use of nuclear magnetic resonance (NMR) phenomena, employing the nuclei of atoms within the fluid. More specifically, a bolus of fluid is magnetized by a pulsed unidirectional magnetic field, and is thereby "tagged" with respect to the unmagnetized fluid preceding and following it, with no observable chemical or physical alteration and with great saving of power. The passage of this tagged bolus is detected a short distance downstream at a detection station having a set of coils. The passage of the tagged bolus generates a signal in one of the coils, which signal is detected and used to retrigger the upstream magnetization pulse so that the pulsing is repetitive and self-sustaining. Each signal corresponds to the passage of a volume of fluid, equal to the volume between the magnetization and detection stations. The signals are counted to yield a digital computation of the volume of fluid flow. The number of pulses occurring in unit time is also proportional to the average fluid velocity.

The unidirectional magnetizing pulse is hereinafter referred to as the magnetizing pulse, and the field produced thereby is designated by $H_{om}$ in which the "$m$" refers to magnetization station, and the "$o$" identifies the direction of the magnetic field produced thereby.

The fluid flowing within the flowmeter of the present invention is made up of compounds and substances which include at least some atoms with nuclei having a magnetic moment vector $\mu$. From a classical point of view, this vector reacts to an externally applied magnetic field by precessing about the direction of the external field. The magnitude of the nuclear magnetic moment vector $\mu$ and the magnitude of the angular momentum vector of each nucleus are invariant, and only their orientations are affected by the application of the external magnetic field. As the relation between these vectors is also invariant, further discussion will consider only the attitude of the $\mu$ vector.

When a unidirectional magnetic field is applied to a fluid including such nuclei, the field causes each $\mu$ vector to precess about the direction of the applied field, at a frequency proportional to the strength of the field. The precessional frequency does not depend upon the orientation of the $\mu$ vector, but only on the magnitude of the applied field. Eventually, damping forces operate to tend to cause the $\mu$ vector to precess in smaller and smaller radii, and eventually to line up in the direction of the applied field. With practical equipment, the number of individual $\mu$ vectors of the nuclei which are actually oriented with the field is a very small fraction of the total because thermal effects tend always to randomize the orientation of all of the nuclei in the fluid. The overall effect of the field is to give a net magnetization M to the fluid body in line with the applied field. Thus, when the magnetic field has been applied for some time there is a net preponderance of $\mu$ vectors aligned with the applied field, to produce a net or macroscopic magnetization of the fluid in the direction of the applied field. The net magnetization has a magnitude of $x_o H_o$ where $H_o$ is the magnetic field applied, and $x_o$ is a function of the material and temperature. The coefficient $x_o$ limits the magnitude of the net magnetization vector M which can be produced by practical equipment, but attainable values of the M vector are sufficient for the purposes of the present invention.

Given an $H_o$ field which is not aligned with the M vector, any inhomogeneity which may be present in the field causes the precession of individual $\mu$ vectors to be at slightly different rates, so that eventually any phase relationship which two $\mu$ vectors may have had with each other is eliminated by incoherent precession.

Incoherent precession is also caused by nuclear interactions. The $\mu$ vector of each nucleus is added to the field in the vicinity of that nucleus. The varying field strength caused thereby, within the fluid, further contributes to incoherent precession, because the rate of precession of each individual nucleus is determined by the field strength at that nucleus. For a perfectly homogeneous field, the incoherent precession of nuclei, and the accompanying dephasing of the $\mu$ vectors, is an exponential function having a time constant $T_2$. Thus, after a time $T_2$ any alignment of the $\mu$ vectors will have decreased by 63% ($1/e$).

The build up (and decay) of the magnitude of the net or macroscopic magnetization vector M is also an exponential relation, but has a different time constant which will be referred to as $T_1$. In fluids, $T_1$ is about the same order of magnitude, but may be somewhat greater than, $T_2$. In other words, dephasing of the $\mu$ vectors may take place more rapidly than alignment of the $\mu$ vectors with a homogeneous applied magnetic field $H_o$, and even more rapidly in an inhomogeneous field.

If the nuclei, which have been aligned by application of a unidirectional magnetic field $H_{om}$ are now suddenly brought into a parallel homogeneous unidirectional field $H_{od}$ and also into an RF field $H_{1d}$ oriented in quadrature with the $H_{om}$ and the $H_{od}$ fields, the orientations of the $\mu$ vectors are shifted. When the $H_{1d}$ field has a frequency $f$ equal to the natural frequency ($f_o$), associated with the amplitude of the applied field, the net magnetization vector M is found to precess about the direction of the RF field, thereby moving away from alignment with the field $H_{od}$. The subscript "$d$" refers to the detection station and "$l$" refers to a direction transverse to the "$o$" direction. As the RF field is applied, the net magnetization vector precesses to an attitude antiparallel with the unidirectional field $H_{od}$ and then to continue back into parallel relation with it. This condition is referred to as the resonance condition. The velocity of precession about the RF field is dependent solely on the amplitude of the RF field.

If the applied RF field is at a frequency other than the $f_o$ frequency (sometimes called the "Larmor" frequency), the $\mu$ vectors attempt to precess about the instantaneous resultant field composed of the $H_{1d}$ and $H_{od}$ fields, but cannot assume an attitude antiparallel to the $H_{od}$ field.

Energy is absorbed from the RF magnetic field in order to cause the $\mu$ vectors (and the M vector) to move away from alignment with the applied field. Similarly, energy is given up to the RF field when the M vector returns toward paralelism with the field. This energy transfer occurs to the greatest extent when RF frequency is the Larmor frequency $f_o$ of the nuclei for the given H field.

When there is no net magnetization M in the fluid, there is no net energy transfer, even at the Larmor frequency $f_o$.

In the present invention, this energy exchange phenomenon is employed to detect a bolus of fluid which has been tagged by being given a net magnetization M. At the detection station, the fluid is subjected to an RF field at the Larmor frequency. When an energy exchange is detected, the tagged bolus is recognized, as there is no net energy exchange with untagged fluid.

As the Larmor frequency $f_o$ is equal to $\frac{1}{2}\gamma H_{od}$, where $H_{od}$ is the total field amplitude and $\gamma$ is a constant for a given fluid, either the frequency of the RF field may be varied, or the amplitude of the RF or H field may be varied in order to sweep through a resonant condition. In this way, variations in temperature and the composition of the fluids flowing through the flowmeter do not affect the time of detection of a tagged bolus. It is convenient to vary the magnitude of the steady field, and this is done by superimposing a small low frequency A.C. field on the unidirectional $H_{od}$ field, thus modulating it, and producing a resultant field $H_{mod}$. The amplitude of $H_{od}$ is greater than the A.C. field, so that $H_{mod}$ remains unidirectional. As the magnitude of the field $H_{mod}$ is varied, the Larmor frequency of the nuclei will vary accordingly, and when this frequency becomes equal to the steady frequency of the applied RF field, the resonance condition is reached.

The presence or absence of the tagged bolus can be determined immediately by noting the absorption of energy, as the magnitude of the H field passes through the critical value.

Exemplary embodiments of the present invention will now be described, with reference to the accompanying figures in which:

FIG. 1 is a functional block diagram of one embodiment of the present invention, including a cross-sectional illustration, partly broken away, of apparatus associated with the magnetization and detection stations;

FIG. 1(a) is a vertical sectional view through a portion of the detection station of the apparatus illustrated in FIG. 1;

FIG. 2 is a vector diagram displaying the orientation of the various magnetic and electromagnetic fields used in the system of FIGS. 1 and 1(a);

FIG. 5 is a functional block diagram of a system similar to that shown in FIG. 1, but employing a different method for detection of the magnetized bolus;

FIG. 6 is a vector diagram displaying the orientation of the various magnetic and electromagnetic fields used in the system of FIG. 5;

Referring now to the embodiment shown in FIG. 1, the fluid, the flow of which is to be measured, is conducted through a smooth bore conduit 10, having a uniform unobstructed interior, from the left to the right. Only the exterior of the conduit 10 is illustrated in FIG. 1, as all of the equipment making up the magnetization and detection stations are located wholly outside the conduit. Such fluid may consist of a substance comprised of many elements at least one of which has atomic nuclei which displays a nuclear magnetic moment $\mu$. The nuclei of most elements are in this category. As hydrogen nuclei meet these conditions, the flowmeter of the present invention is particularly suitable for measuring the flow of hydrocarbons, water, organic fluids or the like.

A short coil 12 is wound directly on the conduit 10, and is surrounded by a shield having end members 14 and 16, and a peripheral member 18. The members of the shield are formed of material having a high magnetic permeability, to confine and concentrate the magnetic field generated by the coil 12.

Figure 4:
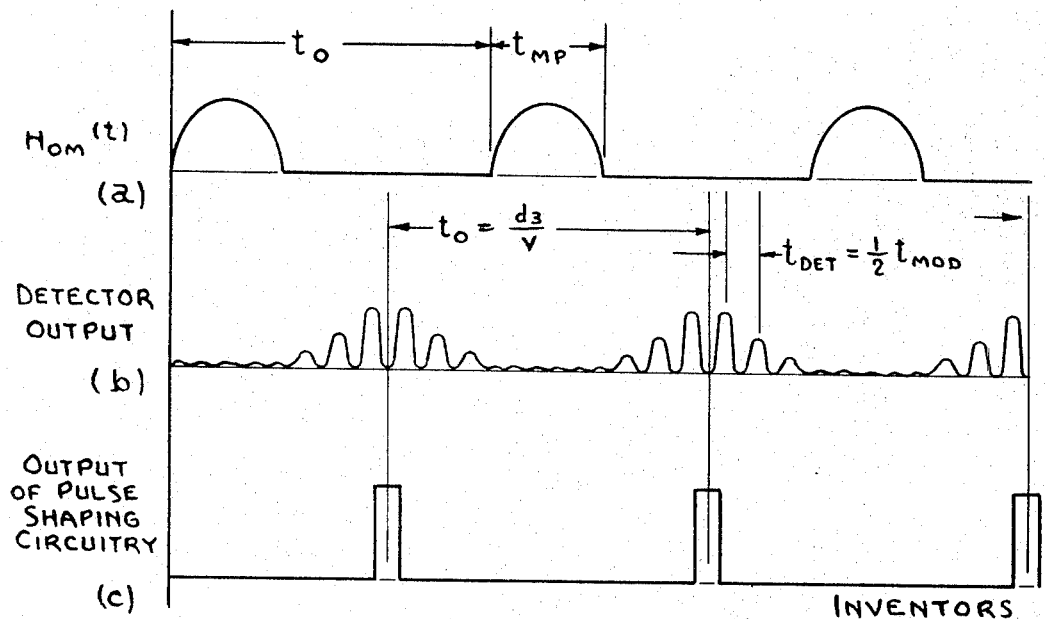

The coil 12 is connected in series with a capacitor 20, through a pair of contacts 22 controlled by a relay 24. When the relay 24 is energized, the contacts 22 close and discharge the capacitor 20 through the coil 12. The capacitor 20 is charged from a D.C. power supply connected to the terminals 26 through a resistor 28. A series connected diode 30 and resistor 32 prevent any back voltage from appearing on the capacitor 20, and dissipate the energy tending to make the coil 12 and the capacitor 20 resonate. A single pulse is applied to the coil 12 by the operation of the relay 24, and the pulse length is dependent primarily upon the inductance of the coil 12 and the capacitance of the capacitor 20. This may be made as short as desired. Such pulses are illustrated in FIG. 4a.

The coil 12 generates, each time it is pulsed, a strong unidirectional pulsed field herein designated $H_{om}$. A feature of this invention is that no particular requirements are placed on the homogeneity of such field. The effect of the pulsed field $H_{om}$ (aligned in an arbitrary direction defined as the Z direction) upon fluid as it passes through the conduit 10 is to generate a net magnetization in such fluid represented by a vector $M_z$ which is collinear with $H_{om}$ as shown in FIG. 2. If the pulse duration is long relative to the time spent in $H_{om}$ by a particular increment of fluid, then the magnitude of $M_z$ is expressed as:

$$M_z = x_o H_{om}\left(1 - e^{-\frac{d_1}{vT_1}}\right) \qquad (1)$$

where $x_o$ is the static nuclear paramagnetic susceptibility of such fluid, $v$ is the velocity of such fluid, $d_1$ is the effective length of $H_{om}$ along the axis of conduit 10, and $T_1$ is the magnetization time constant of the fluid. If the pulse duration is short relative to the time spent by an increment of fluid in the coil 12 producing the $H_{om}$ field, then the magnitude of $M_z$ is:

$$M_z = x_o H_{om}\left(1 - e^{-\frac{t_p}{T_1}}\right) \qquad (2)$$

where $t_p$ is the time duration of the $H_{om}$ pulse. The fluid bolus occupying the coil 12 during the application of the $H_{om}$ pulse is thus magnetized and has magnetization $M_z$ as it leaves field $H_{om}$.

As the fluid continues along the conduit 10, the magnetization decays at a rate according to the time constant $T_1$. It is, therefore, important that the magnetization be sufficient to provide values at places further downstream which can be detected at the detection station as hereinafter described. The magnetization level at the detection station downstream will be in accordance with the following expression:

$$M = M_z e^{-\frac{d_3}{vT_1}} \qquad (3)$$

where $d_3$ is the distance between the magnetization and detection stations.

As the fluid passes downstream through the conduit 10 from the $H_{om}$ field, it enters another unidirectional field $H_{mod}$ created by another coil 34.

The coil 34 is wound on a form 36, which is spaced by spacers 38 and 40 away from the exterior of the conduit 10 to accommodate the detection coils, as described hereinafter. A sleeve 42 surrounds the conduit 10 between the end member 16 associated with the coil 12, and the spacer 38, to maintain a constant spacing between the magnetization coil 12 and the coil 34. The coil 34 is surrounded by a shield having a pair of end members 44 and a peripheral member 46. The members of the shield are formed of material having a high magnetic permeability, to confine and concentrate the magnetic field generated by the coil 34.

Two end coils 48 are located at the ends of the coil 34, within the shield formed by the members 44 and 46, and each is wound on a separate form 50, supported by the spacers 38 and 40, respectively. The coils 48 are coaxial with the coil 34, and are connected in series therewith to increase the homogeneity within the conduit 10 in the vicinity of the detection station.

The $H_{mod}$ field is generated by means of a D.C. current from a direct current supply connected to terminals 52, modulated with a low frequency oscillator 54. The frequency of the oscillator 54 is $$\frac{1}{2\pi}\omega_{mod}$$

Two pairs 56 and 58 of yoke coils are centrally disposed within the coil 34, surrounding the conduit 10. The coils 56a and 56b are secured directly to opposite sides of the exterior wall of the conduit 10, by cement or the like. A form 60 surrounds the coils 56a and 56b, and the coils 58a and 58b are secured to the exterior of the form 60, in orthogonal relationship with the coils 56a and 56b. Each of the coils 56a, 56b, 58a and 58b extends through an arc of about 120°, so that a 60° gap separates each side of the coil 56a from the corresponding side of the coil 56b. It has been found that this configuration provides the best arrangement for assuring homogeneity of field strength within the conduit 10, maximum signal-to-noise ratio of the output of the detection station, and minimum cross coupling between the two pairs of coils. The coils of each pair of coils 56 and 58 are connected in series-aiding relationship.

An RF oscillator 62 generating a frequency of $$\frac{1}{2\pi} \omega_o$$

is connected to the coils 56a and 56b, and the coils 58a and 58b are connected to an amplifier 64.

Figure 3:
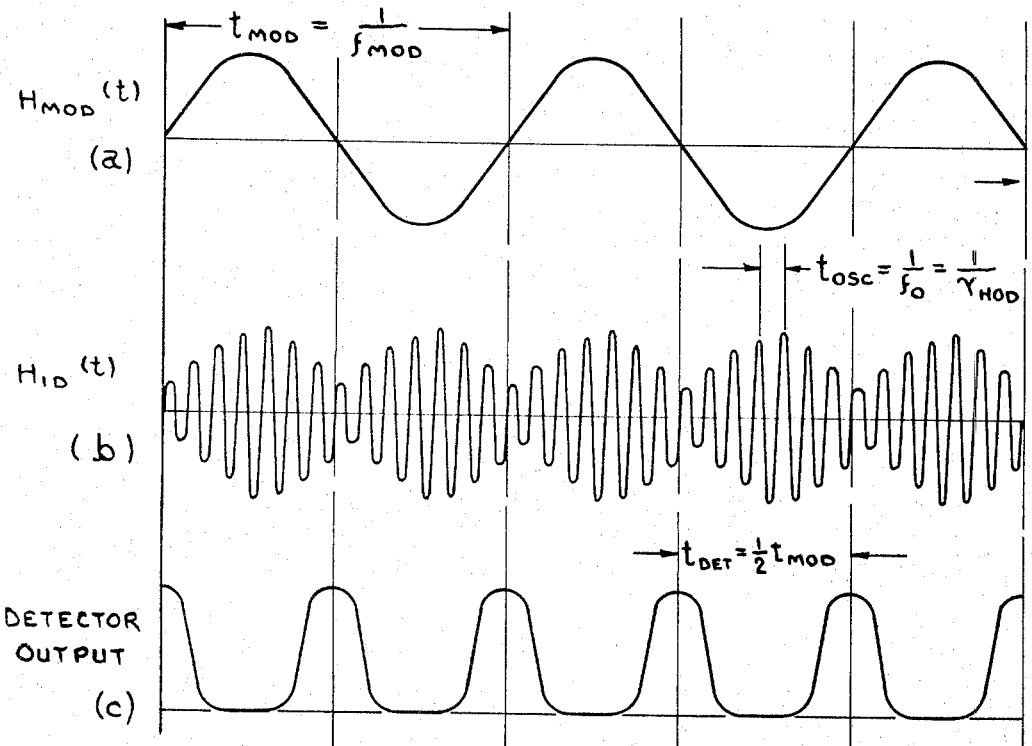
FIGS. 3 and 4 are graphical illustrations of typical waveforms of various fields and voltages within the system diagrammed in FIG. 1.

The level of magnetization M at the detection station is detected during traversals of the nuclear magnetic resonance condition, effected by the modulated field $H_{od}(t)$. The RF field $H_{ld}$ is generated by the oscillator 62, the output current of which is proportional to $$H_{ld} = A \cos(\omega_o t)$$

where A is the amplitude of the field. The oscillator 62 has a high output impedance, so that it is essentially a constant current source. The waveforms and frequency of the fields $H_{ld}$ and $H_{od}$ are interrelated as shown in FIG. 3. The total Z-axis field through the fluid volume within the coils 56a and 56b is $$H_{od}(t) = H_{od} + K \cos(\omega_{mod} t)$$

as shown by FIG. 2. Twice during each cycle of the modulating frequency, the critical value of the field for the nuclear resonant condition $H_{od} = \omega_o/\gamma$ is fulfilled, and the fluid absorbs energy from the field $H_{ld}$.

The energy absorption from the $H_{ld}$ field causes the M vector to move away from the Z axis, toward the X–Y plane.

A voltage is induced in the coils 58a and 58b by virtue of the motion of the magnetic flux represented by the M vector cutting the coils. The output of the amplifier 64 is connected to a detector 66, the output of which is the envelope of the modulation as shown in FIG. 3(c). The detector output pulse height is a measure of the magnetization M of fluid within the coils 56a and 56b. When the tagged bolus moves downstream to occupy the coil pair 58, the elevated magnitude of $M_z$ in the bolus causes the output of the detector 66 to rise as indicated in FIG. 4(b). The envelope of such output has the form of a pulse during the passage of the tagged bolus. For each pulse of $H_{om}$ produced by the coil 12, there is a response pulse on the envelope of the output of detector 66. A shaper circuit 68 is connected to the output of the detector 66, the function of which is to derive a signal from the detector 66 which is long enough and strong enough to ensure positive actuation of the relay 24. This response pulse is shaped in the pulse shaper 68 as indicated in FIG. 4(c) and used to trigger another $H_{om}$ pulse. In this manner the control loop is closed and the pulsing of the coil 12 by the relay 24 is repetitive and self-sustaining. The pulse period, or time between pulses at the output of the pulse shaper 68 is precisely equal to $d_3/v$, and each pulse corresponds to the passage of a volume of fluid equal to the internal volume of conduit 10, existing between the magnetization and detection stations. The pulse repetition rate at the output of the pulse shaper 68 is proportional to the velocity of the fluid passing through the conduit.

If desired, the coils 58a and 58b may be eliminated, and the RF amplifier 64 connected in parallel with the RF oscillator 62. In this event, the amplitude of the signal across the coils 56a and 56b is modulated by a tagged bolus by energy absorption, as illustrated in FIG. 3b, and the detector 66 produces output pulses in response to this modulation. However, the arrangement illustrated is preferred to attain the maximum signal to noise ratio from the detector 66.

An electronic relay may be substituted for the relay 24, to avoid any error due to the time required for the contacts 22 to close.

A second pulse shaper 70 is also connected to the output of the detector 66, to derive a pulse suitable for driving a counter 72, for counting the total number of signals detected.

The total accumulated by the counter 72 is proportional to fluid quantity. The pulse rate is also converted to an analog voltage by means of a frequency to analog converter 74. The output of the converter 74 is connected to a meter 76, or other indicating device such as a chart recorder, for indication of flow velocity.

The accuracy of the measurement of flow quantity and flow rate is dependent only upon the precision with which the arrival of the tagged bolus at the detection station is detected. For this reason, the period of the modulation $\omega_{mod}$ should be very much less than the time between output pulses, as indicated in FIG. 4(c). Also the pairs 56 and 58, and the coil 14, should have as short a dimension along axial dimension of the conduit 10 as practical.

Figure 7:
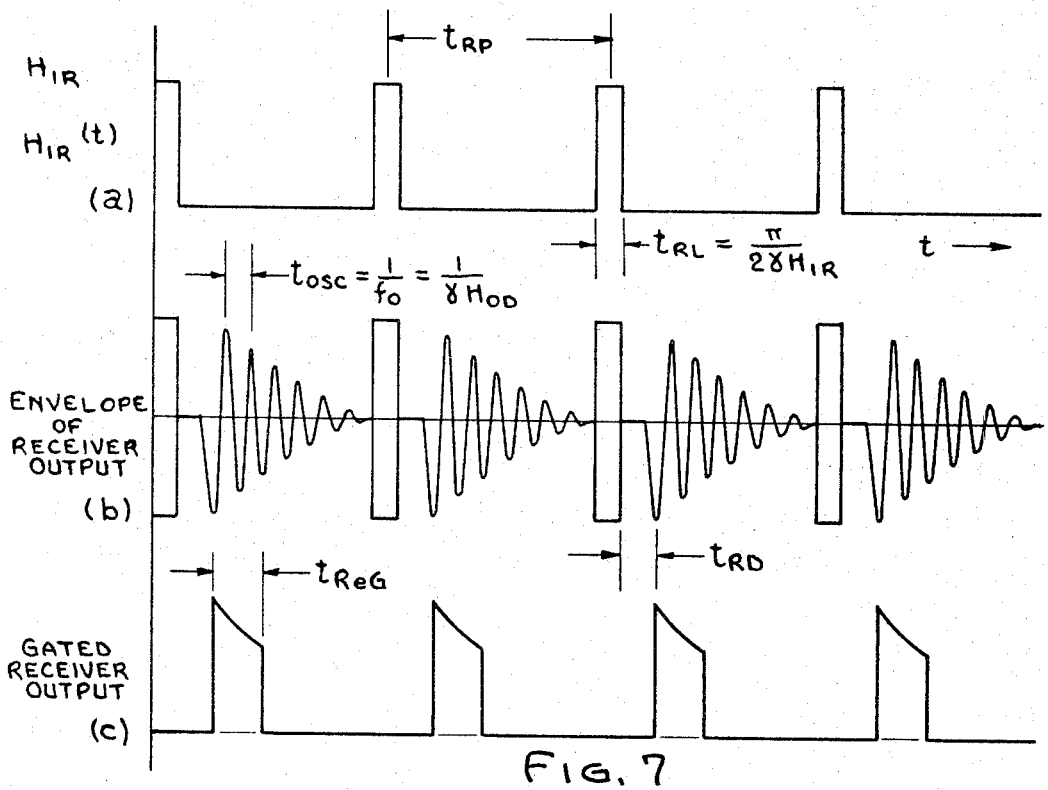
FIGS. 7 and 8 are graphical illustrations of typical waveforms of various fields and voltages within the system diagrammed in FIG. 5.

Other methods for the detection of the tagged bolus may be used. For example, in another embodiment of the invention shown in FIG. 5, employing a conduit 82, a pulse modulated burst of RF at the Larmor frequency is applied to a pair of coils 96a and 96b. The envelope of the burst is illustrated in FIG. 7a. The duration of each of the bursts is very short relative to the burst spacing, but is just sufficient (for the amplitude of the burst) to cause the M vector to precess about the axis of the RF field by 90°. After each such 90° pulse on coils 96a and 96b, the M vector precesses freely in the $H_{od}$ field, and decays at a rate determined by the inhomogeneity of the $H_{od}$ field, as illustrated in FIG. 7(b). The precession is in the plane normal to the axis of the conduit 82, and so can easily be detected to reveal, by the pulses illustrated in FIG. 7(c), the presence of a magnetized bolus at the detection station.

Referring now to FIG. 5, fluid enters a conduit 82 at the left and traverses to the right. A coil 85, wound on the conduit 82, is the magnetization coil, and is pulsed to generate a pulsed unidirectional $H_{om}$ magnetization field, and form the tagged boluses shown in FIG. 7(a). A homogeneous reference field $H_{od}$ is generated by an air core coil 86 encircling the conduit 82 and connected to a supply of direct current 88. Magnetizing pulses for the $H_{om}$ field are gated to the coil 85 by current discharges from an energy storage capacitor 90 via an electronic gate 92, in the manner described in connection with FIG. 1. A direct current supply 94 recharges the energy storage capacitor 90 in the period between $H_{om}$ pulse discharges. The bolus of fluid occupying the coil 85 during the $H_{om}$ field pulse is magnetized to $M_z$ as shown in FIG. 6. This magnetized bolus moves downstream until it reaches the detector coils 96a and 96b.

Figure 8:
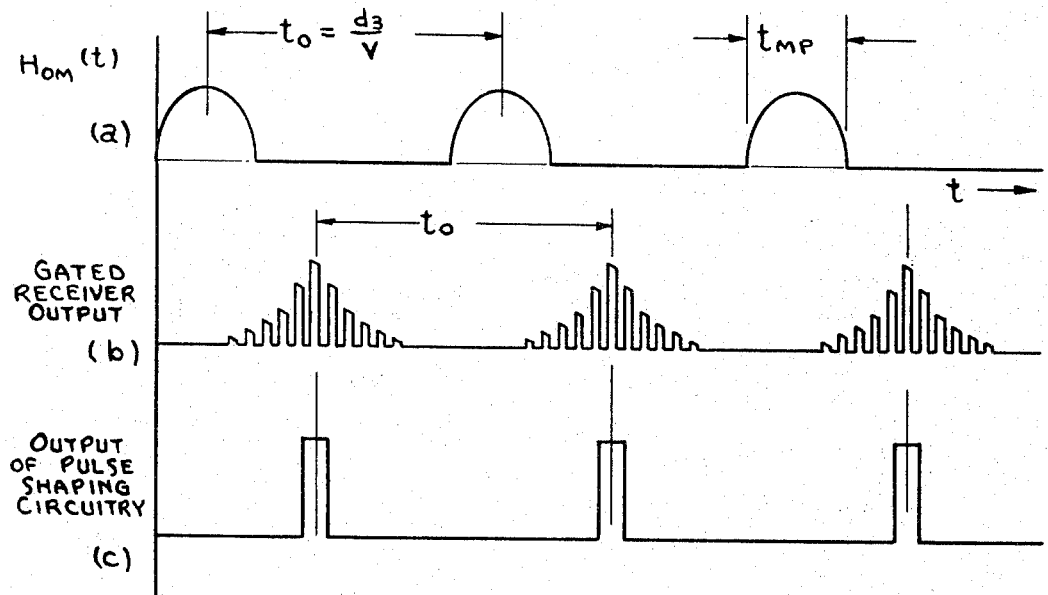

The RF bursts are generated by current from an RF oscillator 98 connected to the coils 96a and 96b via a gate 100 and an isolation network 102. The gate 100 is controlled by a pulse generator 104. The bursts of RF field produced by the coils 96a and 96b are of the appropriate amplitude and duration to rotate the M vector through 90° from collinearity with the Z axis in FIG. 6 to the X–Y plane. The duration of each burst is controlled by the pulse generator 104, which produces pulses continuously spaced apart by $t_{RP}$ (FIG. 7(a)). Following each 90° burst, the magnetization vector M freely precesses, in the X–Y plane (FIG. 6), about the Z axis at frequency $\gamma H_{od}$. The precessing magnetization induces a voltage in coils 96a and 96b which is received and detected in the receiver 106. The isolation network 102 prevents energy from reaching the receiver 106 directly from the gate 100, but allows signals induced in the coils 96a and 96b to pass freely to the receiver 106. The isolation network 102 can be eliminated if isolation is provided by introduction of a second set of orthogonal coils, similar to the coils 58a and 58b illustrated in FIG. 1. In this case, the coils 96a and 96b are excited from the oscillator 98 and the second set of coils picks up the free precession induction and drives the receiver. The coils remain uncoupled with unmagnetized fluid in the conduit 82, and the receiver output is essentially zero. When a magnetized bolus traverses the coils 96a and 96b, the receiver output resembles the train shown in FIG. 8(b), which corresponds to the free precession pulses of FIG. 7(c), modulated by the envelope of the bolus magnetization. This pulse train is further shaped in a pluse shaper 108 to yield the pulses indicated in FIG. 8(c), which are used to trigger $H_{om}$ pulses via gate 92. In this manner, the pulsing action is again repetitive and self-sustaining.

The pulse period, or time between pulses at the output of the pulse shaper 108 is precisely equal to $d_3/v$; and each pulse corresponds to the passage of a volume of fluid equal to the internal volume of conduit 82, existing between the magnetization and detection stations. The pulse repetition rate at the output of pulse shaper 108 is proportional to the velocity of the fluid passing through the conduit.

Pulses from the pulse shaper 108 are counted and totalized by means of a counter 110, which indicates total fluid quantity. The rate of the pulses from the shaper 108 is converted to an analog voltage by means of a frequency to analog converter 112 whose output is sent to a meter 114, or other indicating device such as a chart recorder, for indication of flow velocity.

Although many of the details of the embodiment of FIG. 1 have not been specifically illustrated in FIG. 5, it will be understood that the pulse magnetizer and the mechanical arrangements of the various coils can also be employed with the embodiment of FIG. 5.

By the foregoing description, the present invention has been described in sufficient detail to enable others skilled in the art to make and use the same, without departing from the essential features of novelty thereof, which are intended to be defined and secured by the appended claims.

What is claimed is:

1. Apparatus for metering the flow of a fluid stream conveying at least one element having a nuclear magnetic moment, comprising conduit means for continually conducting fluid in a straight line along a confined path sequentially past a magnetization station and a detection station, tagging means including a magnetization coil at said magnetization station for creating an intermittent unidirectional magnetic field in said fluid in a first direction to alter the nuclear magnetization in a bolus of said fluid, said bolus being tagged thereby with respect to the fluid preceding and following said bolus, and detecting means at said detection station for producing a signal in response to a change in nuclear magnetic resonance as said tagged bolus passes said detection station, said detecting means including field generating means for producing a homogeneous unidirectional magnetic field isolated from said intermittent field, said detection means also including a receiver coil disposed with its axis perpendicular to said first direction.

2. Apparatus according to claim 1, including means for connecting said detection means with said tagging means, to actuate said tagging means in response to each detection.

3. Apparatus according to claim 1, wherein said tagging means comprises means for producing short pulses of a relatively high intensity unidirectional magnetic field within said fluid to alter the nuclear magnetization of successive spaced boluses of said fluid.

4. Apparatus according to claim 3, including means for making the duration of said pulse short in relation to the time required to conduct fluid from said magnetization station to said detection station.

5. Apparatus according to claim 1, wherein said detection means comprises a field generating coil surrounding said conduit means at said detection station for generating a homogeneous magnetic field in said fluid at said detection station, and said tagging means comprises a magnetizing coil surrounding said conduit means at said magnetization station.

6. Apparatus according to claim 5, wherein said field generating coil is long relative to its diameter, and said magnetizing coil is short relative to its diameter.

7. Apparatus according to claim 1, wherein said detecting means comprises means for generating a radio frequency magnetic field at an angle to the field of said nuclear magnetization, and means for detecting transfer of energy between the nuclei and the radio frequency field when said tagged bolus is present at said detection station.

8. Apparatus according to claim 7, including means for connecting said last named means with said tagging means to trigger said tagging means in response to detection of each tagged bolus.

9. Apparatus according to claim 7, wherein said radio frequency field generating means includes a radio frequency oscillator, and means for intermittently causing said oscillator to generate a magnetic field within said conduit means.

10. A method of metering the flow of a fluid stream conveying at least one element having a nuclear magnetic moment, comprising the steps of conducting said fluid from a first location to a second location, applying an intermittent unidirectional magnetic field to the fluid as it passes through said first location to alter the nuclear magnetization in a bolus of said fluid and thereby tag the bolus relative to preceding and following fluid, inducing nuclear magnetic resonance in said tagged bolus at said second location, and detecting the presence of said tagged bolus at said second location by sensing said resonance.

11. The method according to claim 10, wherein said fluid is tagged by a short pulse of said unidirectional magnetic field to produce a bolus of said fluid having an altered nuclear magnetization, said bolus being tagged relative to the fluid preceding and following it.

12. The method according to claim 11, including the step of applying a pulse of said magnetic field at said one location in response to each detection of a tagged bolus at said second location.

13. The method according to claim 12, wherein the duration of said pulse is short in relation to the time required to conduct fluid from said first location to said second location.

14. In a flowmeter for metering the flow of a fluid stream conveying at least one element having a nuclear magnetic moment, a conduit for conveying fluid along a confined path sequentially past a magnetization station and a detection station, a first magnetization coil surrounding said conduit at said magnetization station, means connected to said first magnetization coil to cause said coil to produce an intermittent unidirectional field within said conduit for altering the nuclear magnetization in a bolus of the fluid, means for producing nuclear magnetic resonance within said conduit at said detection station including a second magnetization coil surrounding said conduit at said detection station for producing a unidirectional field within said conduit, and a third coil juxtaposed with said conduit at said detection station for establishing a high frequency magnetic field therein, said second magnetization coil having an inside diameter greater than the outside diameter of the conduit, and a pair of sensing coils disposed diametrically opposite each other between said conduit and second magnetization coil for sensing and detecting said magnetic resonance within said stream and for producing a distinctive signal when said bolus passes said detection station, each of said sensing coils having a yoke-like shape formed with two linear portions aligned in parallel with the axis of said conduit, said linear portions being joined at each end by two arcuate portions.

15. Apparatus according to claim 14, wherein said arcuate portions each extend for about 120° around said conduit.

16. Apparatus according to claim 14, including a second pair of sensing coils disposed diametrically opposite each other between said conduit and said second magnetization coil, said second pair of coils arranged in orthogonal, overlapping arrangement with the first pair of sensing coils, each of said sensing coils having a saddle-like form with two linear portions aligned in parallel with the axis of said conduit, said linear portions being joined at each end with two arcuate portions.

17. Apparatus according to claim 14, including first and second homogeneity-correcting coils surrounding said second magnetization coil in coaxial relation therewith, said first homogeneity-correcting coil surrounding one end of said second magnetization coil and said second homogeneity-correcting coil surrounding the opposite end of said second magnetization coil.

References Cited

UNITED STATES PATENTS

| | | | |
|---|---|---|---|
| 3,024,410 | 3/1962 | Moser | 324—.5 |
| 3,191,119 | 6/1965 | Singer | 324—.5 |

OTHER REFERENCES

Anderson: The Review of Scientific Instruments, vol. 32, No. 3, March 1961, pp. 241–250.

Hahn: Physics Today, vol. 6, No. 11, November 1953, pp. 4–9.

RUDOLPH V. ROLINEC, *Primary Examiner.*

MICHAEL J. LYNCH, *Assistant Examiner.*

U.S. Cl. X.R.

73—194